(12) United States Patent
Ramasamy et al.

(10) Patent No.: US 11,343,136 B2
(45) Date of Patent: May 24, 2022

(54) SYSTEM FOR REAL TIME RECOVERY OF RESOURCE TRANSFERS OVER A DISTRIBUTED SERVER NETWORK

(71) Applicant: BANK OF AMERICA CORPORATION, Charlotte, NC (US)

(72) Inventors: Suki Ramasamy, Chennai (IN); Sai Sushma Dasam, Chennai (IN); Bhuvaneswari Govindarajan, Chennai (IN); Swetha Madhalam, Chennai (IN); Subhashri Seshadri, Chennai (IN); Radhika Thilakar, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/060,108

(22) Filed: Oct. 1, 2020

(65) Prior Publication Data

US 2022/0109603 A1    Apr. 7, 2022

(51) Int. Cl.
*H04L 41/0663* (2022.01)
*H04L 9/40* (2022.01)
*H04L 47/783* (2022.01)
*H04L 47/74* (2022.01)

(52) U.S. Cl.
CPC ........ *H04L 41/0663* (2013.01); *H04L 47/746* (2013.01); *H04L 47/783* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 8,266,111 B2 | 9/2012 | Lin et al. | |
| 9,152,642 B2 | 10/2015 | Harrison et al. | |
| 9,152,643 B2 | 10/2015 | Whitehead et al. | |
| 9,348,830 B2 | 5/2016 | Montulli et al. | |
| 9,483,359 B2 | 11/2016 | Montulli et al. | |
| 9,547,559 B2 | 1/2017 | Whitehead et al. | |
| 9,547,726 B2 | 1/2017 | Ran et al. | |
| 9,578,088 B2 | 2/2017 | Nickolov et al. | |
| 9,734,169 B2 | 8/2017 | Redlich et al. | |
| 9,965,628 B2 | 5/2018 | Ford et al. | |
| 10,073,979 B2 | 9/2018 | Von Kaenel et al. | |

(Continued)

*Primary Examiner* — Mohamed Ibrahim
(74) *Attorney, Agent, or Firm* — Moore & Van Allen PLLC; Seongun M. Hong

(57) ABSTRACT

A system is provided for real time recovery of resource transfers over a distributed server network. In particular, the system may comprise one or more computing systems within a distributed server network, where each computing system may be a node which hosts a copy of a distributed electronic data register. Upon receiving a resource transfer request, the system may, via a system sequence monitor, monitor the various nodes for status updates on the resource transfer. Upon detecting that a node has failed to execute one or more steps in the resource transfer process, a resource transfer restorer may perform a restore process based on the information stored within the distributed data register. The system sequence monitor may further monitor the restore process to ensure the successful completion thereof. In this way, the system may provide instantaneous recovery of failed resource transfers.

18 Claims, 3 Drawing Sheets

(56) References Cited

U.S. PATENT DOCUMENTS

| | | |
|---|---|---|
| 10,503,427 B2 | 12/2019 | Botes et al. |
| 10,789,020 B2 | 9/2020 | Karr et al. |
| 2005/0188089 A1* | 8/2005 | Lichtenstein ......... H04L 47/822 |
| | | 709/226 |
| 2016/0162372 A1 | 6/2016 | Whitehead et al. |
| 2016/0352597 A1* | 12/2016 | Mekkattuparamban ..................... |
| | | H04L 43/0876 |
| 2018/0114205 A1 | 4/2018 | Thomas et al. |
| 2018/0204213 A1* | 7/2018 | Zappier .................. H04L 63/10 |
| 2019/0132373 A1 | 5/2019 | Van Wie et al. |
| 2019/0172059 A1 | 6/2019 | Castagna et al. |
| 2019/0222619 A1 | 7/2019 | Shribman et al. |
| 2019/0287099 A1 | 9/2019 | Tan |
| 2019/0319938 A1 | 10/2019 | Castinado et al. |
| 2019/0354966 A1 | 11/2019 | Himura et al. |
| 2019/0392437 A1 | 12/2019 | Castagna et al. |

* cited by examiner

SYSTEM FOR REAL TIME RECOVERY OF RESOURCE TRANSFERS OVER A DISTRIBUTED SERVER NETWORK

FIELD OF THE INVENTION

The present disclosure embraces a system for real time recovery of resource transfers over a distributed server network.

BACKGROUND

There is a need for an efficient and expedient way to perform recovery of resource transfers.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for real time recovery of resource transfers over a distributed server network. In particular, the system may comprise one or more computing systems within a distributed server network, where each computing system may be a node which hosts a copy of a distributed electronic data register. Upon receiving a resource transfer request, the system may, via a system sequence monitor, monitor the various nodes for status updates on the resource transfer. Upon detecting that a node has failed to execute one or more steps in the resource transfer process, a resource transfer restorer may perform a restore process based on the information stored within the distributed data register. The system sequence monitor may further monitor the restore process to ensure the successful completion thereof. In this way, the system may provide instantaneous recovery of failed resource transfers.

Accordingly, embodiments of the present disclosure provide a system for real time recovery of resource transfers over a distributed server network. The system may comprise a memory device with computer-readable program code stored thereon; a communication device; and a processing device operatively coupled to the memory device and the communication device, wherein the processing device is configured to execute the computer-readable program code to receive a resource transfer request from a user computing system; based on the resource transfer request, initiate a resource transfer using a plurality of nodes, wherein each of the plurality of nodes comprises a copy of a distributed data register; detect, based on a system sequence monitor reading the copy of the distributed data register, that a first node within the plurality of nodes has failed to execute one or more steps in the resource transfer; trigger initiation of a real-time restoration process by a resource transfer restorer; and detect, based on the system sequence monitor reading the copy of the distributed data register, that the real-time restoration process has been completed.

In some embodiments, detecting that the first node has failed to execute one or more steps in the resource transfer comprises detecting that the first node has failed to publish an update indicating that the one or more steps in the resource transfer have been completed; and wherein the real-time restoration process comprises initiating a failover process comprising executing the one or more steps in the resource transfer using a second node.

In some embodiments, detecting that the first node has failed to publish the update comprises detecting that the first node is unresponsive or unreachable.

In some embodiments, detecting that the first node has failed to execute one or more steps in the resource transfer comprises detecting that the first node has published an update indicating that the one or more steps in the resource transfer have failed; and wherein the real-time restoration process comprises reverting the resource transfer.

In some embodiments, the update indicates that the user has provided invalid authentication credentials, wherein the real-time restoration process further comprises transmitting a notification to the user computing system, wherein the notification comprises a request to the user for valid authentication credentials.

In some embodiments, the update indicates that the resource transfer has failed one or more validation checks, wherein the real-time restoration process further comprises transmitting a notification to the user computing system, wherein the notification comprises an indication of the one or more validation checks.

In some embodiments, detecting that the real-time restoration process has been completed comprises the system sequence monitor reading an updated data record published by the second node, wherein the updated data record indicates that the one or more steps have been successfully completed.

Embodiments of the present disclosure also provide a computer program product for real time recovery of resource transfers over a distributed server network. The computer program product may comprise at least one non-transitory computer readable medium having computer-readable program code portions embodied therein, the computer-readable program code portions comprising executable portions for receiving a resource transfer request from a user computing system; based on the resource transfer request, initiating a resource transfer using a plurality of nodes, wherein each of the plurality of nodes comprises a copy of a distributed data register; detecting, based on a system sequence monitor reading the copy of the distributed data register, that a first node within the plurality of nodes has failed to execute one or more steps in the resource transfer; triggering initiation of a real-time restoration process by a resource transfer restorer; and detecting, based on the system sequence monitor reading the copy of the distributed data register, that the real-time restoration process has been completed.

In some embodiments, detecting that the first node has failed to execute one or more steps in the resource transfer comprises detecting that the first node has failed to publish an update indicating that the one or more steps in the resource transfer have been completed; and wherein the real-time restoration process comprises initiating a failover process comprising executing the one or more steps in the resource transfer using a second node.

In some embodiments, detecting that the first node has failed to publish the update comprises detecting that the first node is unresponsive or unreachable.

In some embodiments, detecting that the first node has failed to execute one or more steps in the resource transfer comprises detecting that the first node has published an update indicating that the one or more steps in the resource transfer have failed; and wherein the real-time restoration process comprises reverting the resource transfer.

In some embodiments, the update indicates that the user has provided invalid authentication credentials, wherein the real-time restoration process further comprises transmitting a notification to the user computing system, wherein the notification comprises a request to the user for valid authentication credentials.

In some embodiments, the update indicates that the user has provided invalid authentication credentials, wherein the real-time restoration process further comprises transmitting a notification to the user computing system, wherein the notification comprises a request to the user for valid authentication credentials.

Embodiments of the present disclosure also provide a computer-implemented method for real time recovery of resource transfers over a distributed server network, the computer-implemented method comprising receiving a resource transfer request from a user computing system; based on the resource transfer request, initiating a resource transfer using a plurality of nodes, wherein each of the plurality of nodes comprises a copy of a distributed data register; detecting, based on a system sequence monitor reading the copy of the distributed data register, that a first node within the plurality of nodes has failed to execute one or more steps in the resource transfer; triggering initiation of a real-time restoration process by a resource transfer restorer; and detecting, based on the system sequence monitor reading the copy of the distributed data register, that the real-time restoration process has been completed.

In some embodiments, detecting that the first node has failed to execute one or more steps in the resource transfer comprises detecting that the first node has failed to publish an update indicating that the one or more steps in the resource transfer have been completed; and wherein the real-time restoration process comprises initiating a failover process comprising executing the one or more steps in the resource transfer using a second node.

In some embodiments, detecting that the first node has failed to publish the update comprises detecting that the first node is unresponsive or unreachable.

In some embodiments, detecting that the first node has failed to execute one or more steps in the resource transfer comprises detecting that the first node has published an update indicating that the one or more steps in the resource transfer have failed; and wherein the real-time restoration process comprises reverting the resource transfer.

In some embodiments, the update indicates that the user has provided invalid authentication credentials, wherein the real-time restoration process further comprises transmitting a notification to the user computing system, wherein the notification comprises a request to the user for valid authentication credentials.

In some embodiments, detecting that the real-time restoration process has been completed comprises the system sequence monitor reading an updated data record published by the second node, wherein the updated data record indicates that the one or more steps have been successfully completed The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
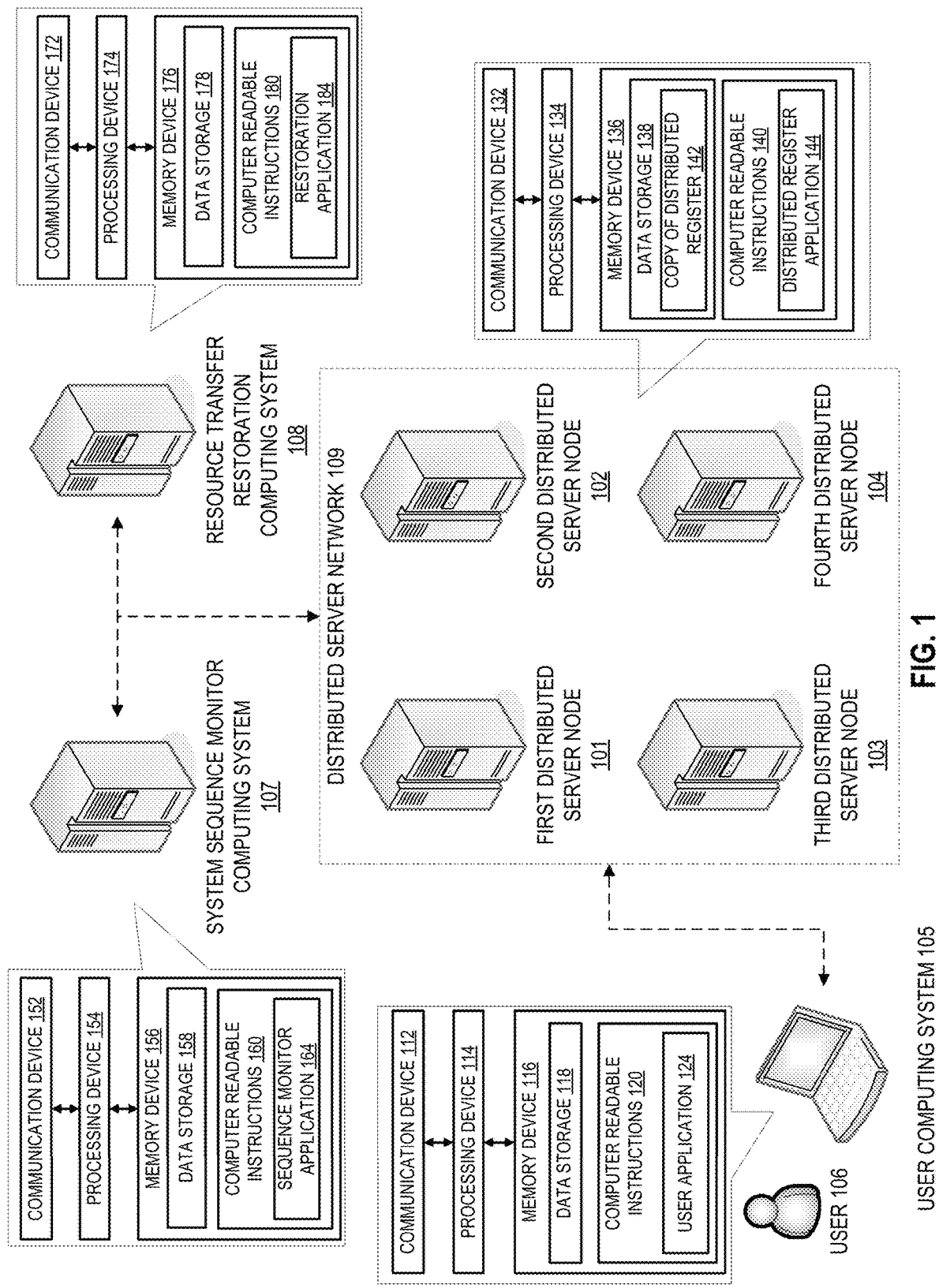
Figure 2:
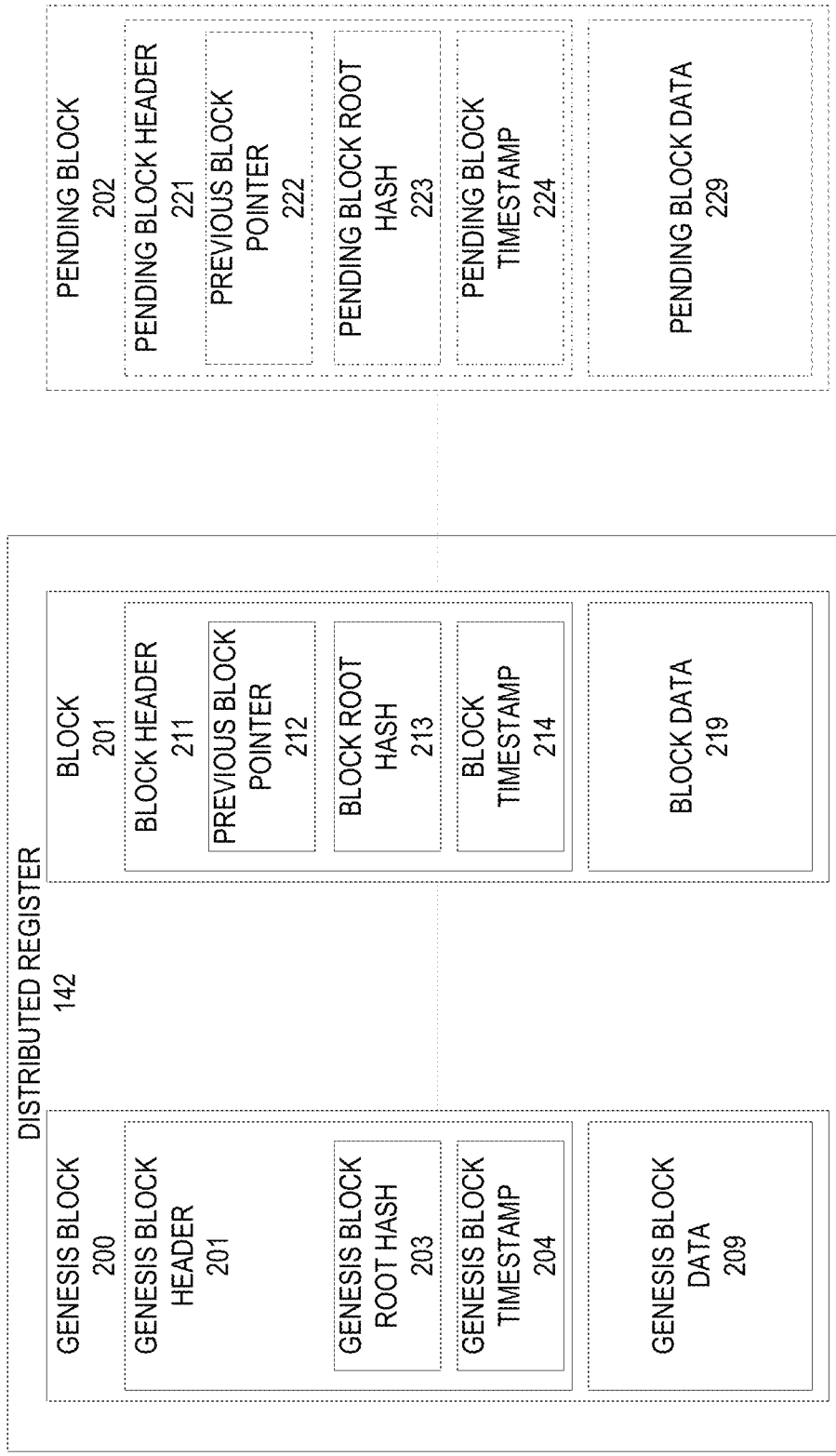
Figure 3:
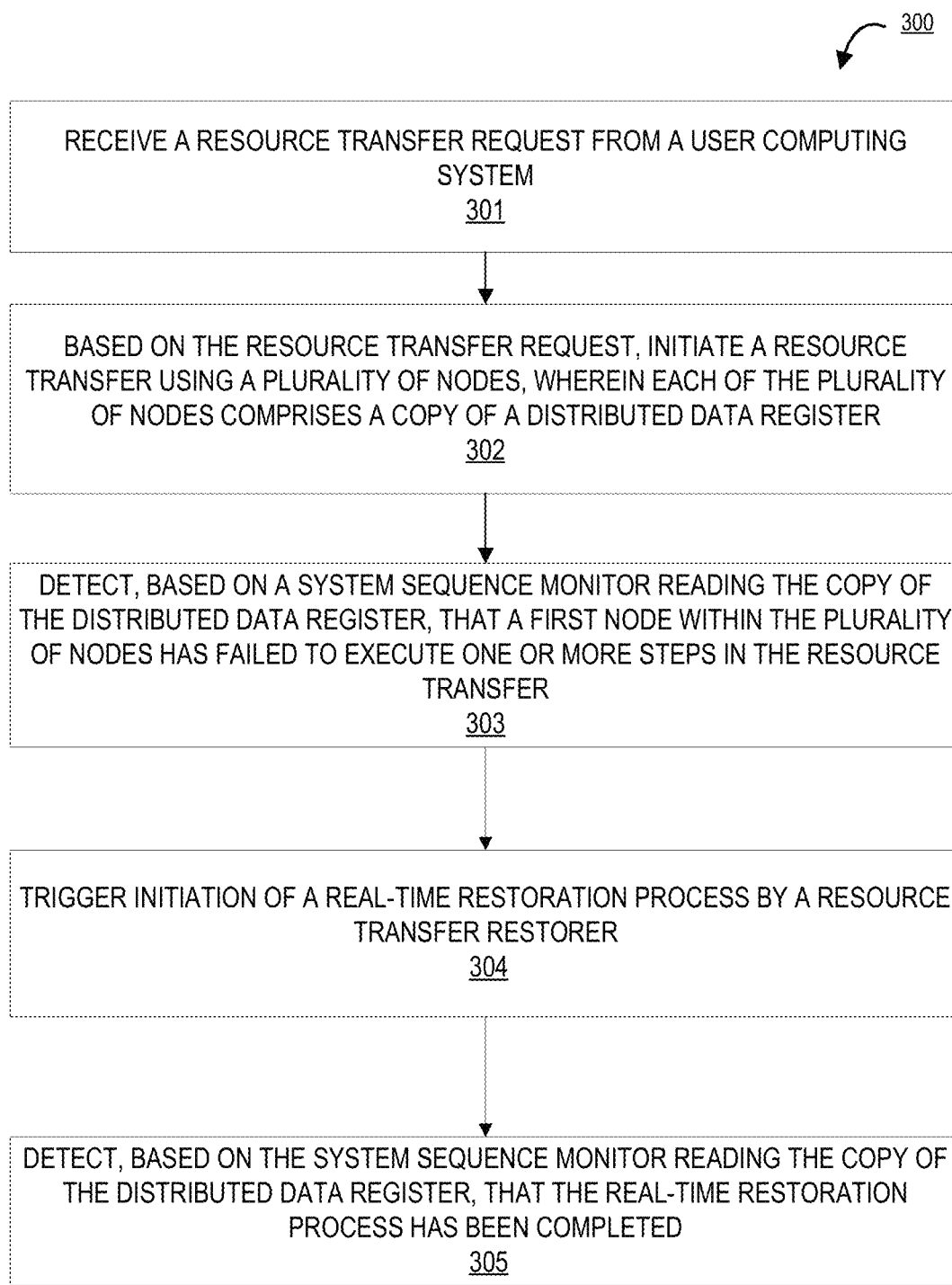

Having thus described embodiments of the invention in general terms, reference will now be made to the accompanying drawings, wherein:

FIG. 1 illustrates an operating environment for the resource transfer recovery system, in accordance with one embodiment of the present disclosure;

FIG. 2 is a block diagram illustrating the data structures within an exemplary distributed register, in accordance with one embodiment of the present disclosure; and FIG. 3 is a flow diagram illustrating a process for performing real-time recovery of a resource transfer using a distributed register, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Resource" as used herein may refer to tangible or intangible objects which may be held, owned, or used by a user and/or the entity. In this regard, examples of such resources may include electronic data files, documents, computing devices and/or other types of electronic hardware, funds, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

A resource transfer process may involve multiple steps that must be executed in order to successfully complete the resource transfer, where the steps may be executed by multiple computing systems within the entity network. Furthermore, one or more of the steps may be dependent on the previous steps in the process such that the processes of certain computing systems may depend on the successful completion of another computing system's processes. For instance, the resource transfer process may require that a first computing system complete an authentication process before the certain other processes (e.g., allocation of resources) is performed by a second or third computing system. A checksum computation may be subsequently performed by the system to perform reconciliation of the resource transfer and revert any resource transfer processes that have failed. That said, the checksum computation may require the participation of all computing systems needed to complete the resource transfer process, which in turn may strain computing resources and prevent new resource transfer processes from being completed. For the above reasons, the system may not run such a checksum computation on a real-time basis.

Accordingly, the system as described herein provides an efficient and expedient way to perform real-time recovery of resource transfer processes. The system may comprise a plurality of nodes within a distributed server network, where each node may execute one or more steps within the resource transfer process. A resource transfer request from a user may trigger a cascade of process executions (or "commits") that are performed by the nodes within the distributed server network. For instance, an exemplary resource transfer process may comprise Steps A, B, C, and D, where Step A is executed by a first node, Step B is executed by a second node, Step C is executed by a third node, and Step D is executed by a fourth node. Certain steps within the process may be dependent on the previous steps (e.g., Step B depends on Step A), while others may be executed independently (e.g., Steps A and C may be executed simultaneously).

Each node may host a distributed register containing information regarding which steps of a resource transfer process have been completed. Accordingly, for each step within the resource transfer process, the corresponding node may push a proposed data record to the other nodes, where the proposed data record indicates the status of a particular step in the resource transfer process. For instance, if the first node has successfully completed Step A, the proposed data record may comprise an indication that the first node has successfully completed Step A. The nodes may then validate the proposed data record to be appended to the distributed register. In this way, the distributed register may serve as a reliable indicator of the overall status of the resource transfer process.

The system may comprise a system sequence monitor, which may be a hardware and/or software agent that may continuously monitor the status of the resource transfer process by reading the distributed register. In this regard, the system sequence monitor may detect scenarios in which a node has failed to provide an update with respect to its corresponding steps in the resource transfer process. For example, the third node may fail to complete Step C of the resource transfer process (e.g., the third node has dropped from the network). Upon detecting such failure, the system sequence monitor may call a resource transfer restorer which may initiate a restoration process to remediate the failed resource transfer. In some embodiments, the system may further be configured to transmit a notification to the user indicating that the transaction has failed at a particular step. In such embodiments, the notification may further indicate that a restoration process has been initiated.

In this regard, the restoration process may comprise restarting the resource transfer process at the step that failed. Continuing the above example, the resource transfer restorer may call the first node and/or the second node to serve as restoration nodes to perform the steps that the third node has failed to perform. In this regard, in some embodiments, the resource transfer restorer may transmit system information that the restoration nodes may require to perform the failed steps. The resource transfer process may then proceed as usual. Meanwhile, the system sequence monitor may also monitor the restoration process. Once each node has provided updates with respect to the resource transfer, the system sequence monitor may consider the resource transfer process to have been completed successfully.

An exemplary use case is provided as follows for illustrative purposes. In one embodiment, a user, who is a customer of an entity such as a financial institution, may transmit a resource transfer request (e.g., a transaction request) to the nodes within the distributed server network. For example, the transaction may be a request to transfer resources from the user's account to a recipient account, where the transaction may comprise one or more steps to be executed by a particular cluster of nodes. In this regard, the nodes may each host a copy of a permissioned and/or private distributed register comprising data records of the one or more steps of the transaction that have been executed by the nodes.

Certain nodes within the cluster of nodes may be configured to execute certain steps within the resource transfer process. In such a configuration, each node within the cluster may be aware of the particular steps that are being executed by each of the other nodes within the cluster. For instance, a first node may perform authentication of the user, a second node may perform validity checks on the user's account (e.g., verify that the user account contains adequate resources to cover the resource transfer), a third node may perform transaction clearing functions, and the like. Upon receiving the transaction request, each of the nodes within the cluster may begin to execute its designated steps to complete the resource transfer process. Once a node has completed its step within the process, the node may push a proposed data record to the remaining nodes, where the proposed data record indicates completion of the step. For example, upon successfully authenticating the user, the first node may publish a proposed data record indicating that the user has been successfully authenticated.

Meanwhile, the system sequence monitor may continuously check the distributed register for updates from the nodes on which steps of the resource transfer process have been completed. If the system detects that all nodes have provided updates indicating successful completion of the steps, the transaction may proceed as requested. On the other hand, the system sequence monitor may further be configured to detect issues or failures within a transaction process. In some embodiments, the system sequence monitor may detect that a node has failed to provide an update (e.g., the network connection to the third node has timed out). In other embodiments, the system sequence monitor may detect that a node has published an update indicating an issue with the transaction. For instance, the second node may publish an update indicating that the user account does not contain adequate resources to continue with the transaction.

The resource transfer restorer may then initiate a restoration process to resolve the identified issues. For example, in the case of the third node timing out, the restoration process may comprise a failover process by which another node within the cluster (e.g., the first node or the second node) performs the failed steps of the third node (e.g., the clearing of the transaction). In such scenarios, the resource transfer restorer may transmit the information needed to complete the failed steps to the nodes performing the failover process. In other embodiments, such as when the second node detects that the user account contains inadequate resources, the restoration process may comprise reverting the transaction and transmitting a notification to the user, where the notification indicates that the transaction has failed along with the associated reasons for the failure (e.g., the user account contains inadequate resources). The system sequence monitor may then monitor the restoration process to ensure the appropriate resolution of the resource transfer request.

The system as described herein confers a number of technological advantages over conventional resource transfer recovery systems. For instance, by using a distributed data register to store information regarding the various systems and steps involved in the resource transfer process, the system may provide real-time or near real-time detection of issues with the resource transfer, which in turn allows the system to immediately begin executing restoration and remediation processes. Furthermore, the system may remove the need to perform a computationally expensive check sum run which may tie up the computing resources of the computing systems performing the resource transfer process, which in turn helps prevent the issue of said computing systems being unavailable to process additional resource transfers during the check sum run.

Turning now to the figures, FIG. 1 illustrates an operating environment 100 for the resource transfer recovery system, in accordance with one embodiment of the present disclosure. In particular, FIG. 1 illustrates a first distributed server node 101, a second distributed server node 102, a third distributed server node 103, and a fourth distributed server node 104 within a distributed server network 109, where each of the nodes 101, 102, 103 host a copy of a distributed register 142, as will be described in further detail below. A user computing system 105, a system sequence monitor computing system 107, and a resource transfer restoration computing system 108 may be communicatively coupled with one or more of the nodes 101, 102, 103, 104 within the distributed server network 109. The nodes 101, 102, 103, 104 may further be communicatively coupled with one another such that the nodes may send data to and receive data from the other nodes within the distributed server network 109.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts four distributed server nodes 101, 102, 103, 104, it is within the scope of the disclosure for the distributed server network 109 to comprise fewer nodes (e.g., two or three) or more nodes (e.g., four, five, and the like) depending on the type of resource transfer being requested. Similarly, though a single user computing system 105 is depicted in FIG. 1, the operating environment 100 may comprise multiple user computing systems in communication with the nodes 101, 102, 103, 104. It should also be appreciated that one or more functions of the systems, devices, or servers as depicted in FIG. 1 may be combined into a single system, device, or server and/or performed by other computing systems. For instance, though the system sequence monitor computing system 107 and resource transfer restoration computing system 108 are depicted as separate computing systems, it is within the scope of the disclosure for the functions of both computing systems to be executed on a single computing system. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first distributed node 101, second distributed server node 102, third distributed server node 103, and the fourth distributed server node 104 may form a cluster of nodes that perform the steps of a resource transfer process requested by the user computing system 105. Accordingly, each of the nodes 101, 102, 103, 104 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, WiFi or Ethernet adapter, radio transceiver, or other device for communicating with other devices on the network.

The memory device 136 comprises computer-readable instructions 140 and data storage 138, where the data storage 138 may comprise a copy of a distributed register 142. The distributed register (and the copy of the distributed register 142) may comprise a series of data records relevant to the objectives of an entity associated with the distributed server network 109. For instance, the distributed register may comprise a series of data records which may contain data and/or metadata associated resource transfers processed by the nodes 101, 102, 103, 104 within the distributed server network 109. In this regard, the computer-readable instructions 140 may have a distributed register application 144 stored thereon, where the distributed register application 144 may allow the nodes 101, 102, 103, 104 to read data from the distributed register, submit data records to the distributed register, participate in consensus mechanisms, or the like. In particular, the nodes 101, 102, 103, 104 may be configured to publish proposed data records to the distributed register, where the proposed data records may comprise updates on the status of the resource transfer process being executed by each of the nodes 101, 102, 103, 104.

As further illustrated in FIG. 1, the user computing system 105 may be in operative communication with the nodes 101, 102, 103, 104 within the distributed server network 109, the system sequence monitor computing system 107, and/or the resource transfer restoration computing system 108. The user computing system 105 may be a computing system owned and/or operated by a user 106, where the user may be a customer of the entity. Accordingly, the user computing system 105 may comprise a communication device 112, a processing device 114, and a memory device 116. In some embodiments, the user computing system 105 may comprise hardware and/or software components that allow the user computing system 105 to interface with the user 106. In such embodiments, the user computing system 105 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 112, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

The memory device 116 of the user computing system 105 may further comprise data storage 118 and computer-readable instructions 120 stored thereon, where the computer-readable instructions 120 may comprise a user application 124. The user application 124 may be a software application that the user 106 may use to transmit resource transfer requests to the nodes 101, 102, 103, 104 within the distributed server network 109 and/or receive notifications from the nodes 101, 102, 103, 104, the system sequence monitor computing system 107, and/or the resource transfer restoration computing system 108.

As illustrated in FIG. 1, the system sequence monitor computing system 107 may be a computing system that continuously monitors the nodes 101, 102, 103, 104 within the distributed server network 109 during a resource transfer process and/or a resource transfer restoration process. Accordingly, the system sequence monitor computing system 107 may comprise a processing device 154 operatively coupled to a communication device 152 and a memory device 156. The memory device 156 may comprise data storage 158 and computer readable instructions 160 stored thereon, where the computer readable instructions 160 may comprise a sequence monitor application 164. The sequence monitor application 164 may, when executed by the processor 154 of the system sequence monitor computing system 107, cause the processor 154 to monitor the distributed register 142 for updates from each of the nodes 101, 102, 103, 104 during a resource transfer process and/or a restoration process. Upon detecting issues with a resource transfer process, the system sequence monitor computing system 107 may immediately trigger execution of a restoration process by the resource transfer restoration computing system 108.

The resource transfer restoration computing system 108 may be a computing system which may execute restoration processes on failed resource transfers. In this regard, the resource transfer restoration computing system 108 may comprise a processing device 174 operatively coupled to a communication device 172 and a memory device 176. The memory device 176 may comprise data storage 178 and computer readable instructions 180 stored thereon, where the computer readable instructions 180 may comprise a restoration application 184. The restoration application 184 may be configured to perform a restoration process for a resource transfer upon being triggered by the system sequence monitor computing system 107. For instance, the restoration process may comprise performing a failover from a failed node to another node within the distributed server network 109. In such embodiments, the restoration application 184 may transmit the necessary data to the node performing the failover such that the resource transfer may proceed.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 is a flow diagram illustrating a process for performing real-time recovery of a resource transfer using a distributed register, in accordance with one embodiment of the present disclosure. The process begins at block 301, where the system receives a resource transfer request from a user computing system. The user computing system may be a system external to the nodes of the distributed server network. In such scenarios, the user computing system may be configured to communicate with the nodes through an application programming interface ("API") layer to transmit data to (e.g., transmit resource transfer requests) and receive data from (e.g., receive notifications from) the systems within the distributed server network.

In an exemplary embodiment, a user of an entity such as a financial institution may transmit a request to process a transaction involving a transfer of resources from an account of the user to an account of a recipient. In such embodiments, the system may display a graphical interface (e.g., through an application provided by the entity or a web-based application hosted by the entity) to the user computing system through which the user may input the parameters of the resource transfer request (e.g., transferor account, recipient account, resource amount, scheduled transfer date and/or time, and the like).

The process continues to block 302, where the system, based on the resource transfer request, initiates a resource transfer using a plurality of nodes, wherein each of the plurality of nodes comprises a copy of a distributed data register. The resource transfer may comprise a plurality of steps that must be executed in order to successfully complete the resource transfer. For example, a transaction may include the steps of authenticating the user, performing validation checks on the account of the user and/or the account of the recipient (e.g., verifying that the account numbers are valid, that the account of the user contains adequate resources for the transfer, and the like), executing the transaction, clearing the transaction, settling the transaction, and the like. Each of the plurality of nodes may be configured to execute a portion of the resource transfer process (e.g., one or more steps of the transaction) such that the resource transfer process is completed entirely by the plurality of nodes. For instance, a first node may perform authentication of the user, a second node may perform the validation checks, a third node may perform the execution of the transaction, and the like. Accordingly, in some embodiments, the distributed data register may comprise information about the status of each of the steps involved in the resource transfer process. In particular, each of the nodes may be configured to write updates to the distributed data register regarding the steps that the node has performed. For example, the first node, upon successfully authenticating the user, may submit an update to the distributed data register indicating successful authentication of the user. Similarly, upon successfully executing the validation checks, the second node may submit an update indicating that the validation checks have been completed successfully.

A system sequence monitor may be configured to continuously monitor and track the status updates for each node by reading the information within the distributed data register. If the system sequence monitor detects that all of the nodes have provided updates indicating successful completion of their designated steps, then the system may consider the resource transfer process to have been completed successfully. If, on the other hand, one or more nodes fails to provide an update or provides an update indicating that one or more steps have not been completed successfully, the system may take one or more remediation steps, as will be described in further detail below.

The process continues to block 303, where the system detects, based on a system sequence monitor reading the copy of the distributed data register, that a first node within the plurality of nodes has failed to execute one or more steps in the resource transfer. In some embodiments, the first node may have failed to transmit an update to the distributed data register with respect to the one or more steps that were assigned to the first node (e.g., authenticating the user). The first node may fail to provide an update, for example, if the first node has become unresponsive (e.g., system freeze, instability, or the like), unreachable (e.g., the system has powered off or has disconnected from the network), or the like. In such embodiments, the system sequence monitor may detect, based on an update being missing from the first node, that the first node has failed to perform the one or more steps. In other embodiments, the first node may transmit an update to the distributed data register indicating that the one or more steps have failed. For example, the update from the first node may indicate (e.g., via an error message and/or error code) that the authentication credentials provided by the user are invalid (e.g., the user has provided the wrong password or authorization code). In such embodiments, the system may read the error message from the distributed data register to determine that the first node has failed to execute the one or more steps.

The process continues to block 304, where the system triggers initiation of a real-time restoration process by a resource transfer restorer. In some embodiments, the one or more steps that failed may in turn be completed through a failover mechanism by tasking another node (e.g., the second node) with completing the one or more steps in place of the first node. For instance, if the first node has failed to execute the one or more steps as a result of being unresponsive, the real-time restoration process may comprise executing the one or more steps in the resource transfer using a second node. In such embodiments, the resource transfer restorer may initiate a failover process which may involve transmitting the data and/or metadata needed for the second node to complete the one or more steps. For instance, if the failed one or more steps include authenticating the user, the resource transfer restorer may transmit the authentication data needed for the second node to perform the authentication of the user.

In other embodiments, the failure of the one or more steps may cause the entire resource transfer process to be reverted. For instance, if the user has provided incorrect or invalid authentication credentials, then the resource transfer process may be reverted until the user initiates a new resource transfer process with the correct authentication credentials. In such embodiments, the restoration process may comprise reverting the steps performed by the remaining nodes associated with the resource transfer process. For instance, if the clearing step of the transaction process has failed, the system may revert the execution of the transaction by the other nodes.

The process concludes at block 305, where the system detects, based on the system sequence monitor reading the copy of the distributed data register, that the real-time restoration process has been completed. In this regard, the system sequence monitor may continuously monitor the distributed data register throughout the restoration process. Accordingly, in embodiments in which the restoration process comprises a failover to another node such as the second node, the system sequence monitor may monitor the distributed data register for an update from the second node that the one or more steps have been completed successfully. Once all of the remaining nodes have pushed updates to the distributed register, the system sequence monitor may determine that the restoration process has been completed successfully, which in turn indicates that the resource transfer process has been completed successfully. In embodiments in which the restoration process comprises a reversion of the transaction, the system sequence monitor may track updates pushed by the nodes performing the necessary actions to revert the transaction. Once each of the nodes has provided updates of the reversion, the system sequence monitor may consider the restoration process to have been completed successfully.

In some embodiments, the system transmits a notification to the user computing system upon completion of the resource transfer process and/or the restoration process. In some embodiments, if the restoration process was successful in remediating the resource transfer, the notification to the user may indicate that the resource transfer was successfully completed. In other embodiments, the notification may indicate that the resource transfer has failed and been reverted. In such embodiments, the notification may further comprise the details of the failure (e.g., an error message or code, a description of the failure, or the like) and information about further steps needed to execute a successful resource transfer. For instance, if the resource transfer has failed the validation stage, the notification may include information about the items to be corrected (e.g., ensure that the account of the user contains adequate resources) before a resource transfer may be successfully completed. In the manner described above, the system provides a way to perform real-time recovery and/or reversion of resource transfers.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real time recovery of resource transfers over a distributed server network, the system comprising:
    a memory device with computer-readable program code stored thereon;
    a communication device; and
    a processing device operatively coupled to the memory device and the communication device, wherein the processing device is configured to execute the computer-readable program code to:
        receive a resource transfer request from a user computing system;
        based on the resource transfer request, initiate a resource transfer using a plurality of nodes, wherein each of the plurality of nodes comprises a copy of a distributed data register, wherein the plurality of nodes comprises a first node configured to execute a first step in the resource transfer and a second node configured to execute a second step in the resource transfer, wherein the first step comprises authenticating the user, wherein the second step comprises executing validation checks on the resource transfer request;
        detect, based on a system sequence monitor reading the copy of the distributed data register, that the first node has failed to execute the first step in the resource transfer;
        trigger initiation of a real-time restoration process by a resource transfer restorer; and
        detect, based on the system sequence monitor reading the copy of the distributed data register, that the real-time restoration process has been completed.

2. The system according to claim 1, wherein detecting that the first node has failed to execute the first step in the resource transfer comprises:
   detecting that the first node has failed to publish an update indicating that the first step in the resource transfer has been completed; and
   wherein the real-time restoration process comprises initiating a failover process comprising executing the first step in the resource transfer using a second node.

3. The system according to claim 2, wherein detecting that the first node has failed to publish the update comprises detecting that the first node is unresponsive or unreachable.

4. The system according to claim 1, wherein detecting that the first node has failed to execute the first step in the resource transfer comprises:
   detecting that the first node has published an update indicating that the first step in the resource transfer has failed; and
   wherein the real-time restoration process comprises reverting the resource transfer.

5. The system according to claim 4, wherein the update indicates that the user has provided invalid authentication credentials, wherein the real-time restoration process further comprises transmitting a notification to the user computing system, wherein the notification comprises a request to the user for valid authentication credentials.

6. The system according to claim 4, wherein the update indicates that the resource transfer has failed one or more validation checks, wherein the real-time restoration process further comprises transmitting a notification to the user computing system, wherein the notification comprises an indication of the one or more validation checks.

7. The system according to claim 1, wherein detecting that the real-time restoration process has been completed comprises the system sequence monitor reading an updated data record published by the second node, wherein the updated data record indicates that the first step has been successfully completed.

8. A computer program product for real time recovery of resource transfers over a distributed server network, the computer program product comprising at least one non-transitory computer readable medium having computer-readable program code portions embodied therein, the computer-readable program code portions comprising executable portions for:
   receiving a resource transfer request from a user computing system;
   based on the resource transfer request, initiating a resource transfer using a plurality of nodes, wherein each of the plurality of nodes comprises a copy of a distributed data register, wherein the plurality of nodes comprises a first node configured to execute a first step in the resource transfer and a second node configured to execute a second step in the resource transfer, wherein the first step comprises authenticating the user, wherein the second step comprises executing validation checks on the resource transfer request;
   detecting, based on a system sequence monitor reading the copy of the distributed data register, that the first node has failed to execute the first step in the resource transfer;
   triggering initiation of a real-time restoration process by a resource transfer restorer; and
   detecting, based on the system sequence monitor reading the copy of the distributed data register, that the real-time restoration process has been completed.

9. The computer program product of claim 8, wherein detecting that the first node has failed to execute the first step in the resource transfer comprises:
   detecting that the first node has failed to publish an update indicating that the first step in the resource transfer has been completed; and
   wherein the real-time restoration process comprises initiating a failover process comprising executing the first step in the resource transfer using a second node.

10. The computer program product of claim 9, wherein detecting that the first node has failed to publish the update comprises detecting that the first node is unresponsive or unreachable.

11. The computer program product of claim 8, wherein detecting that the first node has failed to execute the first step in the resource transfer comprises:
    detecting that the first node has published an update indicating that the first step in the resource transfer has failed; and
    wherein the real-time restoration process comprises reverting the resource transfer.

12. The computer program product of claim 11, wherein the update indicates that the user has provided invalid authentication credentials, wherein the real-time restoration process further comprises transmitting a notification to the user computing system, wherein the notification comprises a request to the user for valid authentication credentials.

13. A computer-implemented method for real time recovery of resource transfers over a distributed server network, the computer-implemented method comprising:
    receiving a resource transfer request from a user computing system;
    based on the resource transfer request, initiating a resource transfer using a plurality of nodes, wherein each of the plurality of nodes comprises a copy of a distributed data register, wherein the plurality of nodes comprises a first node configured to execute a first step in the resource transfer and a second node configured to execute a second step in the resource transfer, wherein the first step comprises authenticating the user, wherein the second step comprises executing validation checks on the resource transfer request;
    detecting, based on a system sequence monitor reading the copy of the distributed data register, that the first node has failed to execute the first step in the resource transfer;
    triggering initiation of a real-time restoration process by a resource transfer restorer; and
    detecting, based on the system sequence monitor reading the copy of the distributed data register, that the real-time restoration process has been completed.

14. The computer-implemented method of claim 13, wherein detecting that the first node has failed to execute the first step in the resource transfer comprises:
    detecting that the first node has failed to publish an update indicating that the first step in the resource transfer has been completed; and
    wherein the real-time restoration process comprises initiating a failover process comprising executing the first step in the resource transfer using a second node.

15. The computer-implemented method of claim 14, wherein detecting that the first node has failed to publish the update comprises detecting that the first node is unresponsive or unreachable.

16. The computer-implemented method of claim 13, wherein detecting that the first node has failed to execute the first step in the resource transfer comprises:

detecting that the first node has published an update indicating that the first step in the resource transfer has failed; and wherein the real-time restoration process comprises reverting the resource transfer.

17. The computer-implemented method of claim 16, wherein the update indicates that the user has provided invalid authentication credentials, wherein the real-time restoration process further comprises transmitting a notification to the user computing system, wherein the notification comprises a request to the user for valid authentication credentials.

18. The computer-implemented method of claim 13, wherein detecting that the real-time restoration process has been completed comprises the system sequence monitor reading an updated data record published by the second node, wherein the updated data record indicates that the first step has been successfully completed.

* * * * *